3,123,534
IRRADIATION METHOD INCLUDING THE PRODUCTION OF POLYAROMATIC ETHERS

Robert O. Bolt, San Rafael, and Walter W. Hanneman, El Cerrito, Calif., assignors, by mesne assignments, to the United States of America as represented by the United States Atomic Energy Commission
No Drawing. Filed Aug. 22, 1960, Ser. No. 51,240
9 Claims. (Cl. 176—39)

The present invention relates, in general, to methods in which oxygen containing organic materials are exposed to irradiation and, more particularly, to methods in which a mixture including at least one oxygen containing organic compound is exposed to irradiation with the consequent production of valuable organic compounds including polyaromatic ethers and especially to methods wherein such mixtures are exposed to irradiation when disposed in a nuclear reactor, e.g., as a coolant.

Polyphenyl ethers are known to be superior lubricants in high temperature heavy duty service. Moreover, such materials also possess superior properties as high temperature hydraulic fluids, plasticizers, heat transfer agents and the like. In research directed to the development of organic fluid materials for use in a radiation environment it has been noted that certain classes of aromatic compounds exhibit a satisfactorily high degree of resistance to degradation when utilized at high temperatures in a high radiation flux. Aromatic compounds and, especially polyphenyls and alkylated polyphenyls to a lesser degree, have been successfully utilized as coolants and moderators in nuclear reactors. More recently polyphenyl ethers, have been shown to possess superior properties as high-temperature, radiation-resistant fluids which may be utilized as coolants, moderators and in the formulation of lubricants, etc., for use in such environments. In this connection, it may be noted that a significant portion of the cost of operating nuclear reactors utilizing organic moderators, coolants, etc., resides in the provision of the costly material employed as coolants, in the treatment of the coolant, etc., to remove radiation damaged materials and in the reconstitution of the material employed in the reactor for makeup purposes. While the production of energy in such reactors has been demonstrated to be technologically feasible, the economic feasibility is somewhat more marginal. Further advances which would lower coolant costs migh then effect a very significant advance toward the realization of highly efficient and economic nuclear energy installations.

The present invention contemplates the provision of the organic fluid materials utilized as coolants, moderators, etc., in such a reactor in the form of an organic compound or a mixture of selected composition which undergoes reaction under the irradiation conditions prevailing in the reactor to produce valuable products which may be recovered and marketed so as to offset costs. The organic fluid is in this manner caused to serve a dual purpose. By including lower polyphenyls and alkylated polyphenyls in admixture with polyphenyl and alkylated polyphenyl ethers higher and lower polyphenyls and alkylated polyphenyls, as well as higher and lower polyphenyl ethers, are produced. When a phenoxy-material is included in the mixture some of the material enters into reactions which produce higher polyphenyl ethers, alkylated polyphenyl ethers or a higher molecular weight phenol or phenoxy type compound. The phenolic compounds produced in this manner would be valuable as bactericides, monomers for cross-linked condensation polymers, intermediates in synthesis and the like. Generally speaking, phenolic products are obtained in significant quantities only when a phenoxy compound is employed in the original mixture.

Alternatively, fractions containing materials of superior radiation resistance may be separated from the irradiated mixture and recycled as a coolant, etc. As in ordinary reactor practice, a complex mixture containing, however, higher molecular weight polyphenyl ethers, phenols as noted above and other materials are formed. Upon extended exposure the proportions of the latter steadily increase and eventually heavy tarry materials are produced in sufficient quantities to cause undue viscosity changes in the mixture. Accordingly, the radiolyzed mixture is withdrawn periodically or small proportions thereof are withdrawn at intervals before the viscosity becomes too great to permit ready flow and the withdrawn material is separated into fractions as by distillation and/or other conventional methods. Selected fractions may then be reintroduced into the reaction system with additional starting material to increase the radiation resistance thereof and/or to produce additional product as desired. Of course, selected compounds or fractions of the product containing, e.g., phenols or polyphenyl ethers may be utilized for other purposes as noted above.

Accordingly, it is an object of the invention to provide a method of utilizing selected aromatic organic fluid mixture in a nuclear reactor to serve dual purpose functions of coolant, moderator, etc., and synthesis of valuable products.

Another object of the invention is to provide a method wherein selected mixtures of aromatic organic compounds including polphenyls, and/or polyphenyl ethers with or without aromatic phenoxy-type compounds are introduced into a nuclear reactor to produce valuable products while serving another utilitarian purpose in such reactor.

A further object of the invention is to provide a method for cooling a nuclear reactor wherein a first material of selected composition is introduced into the reactor to be exposed to radiation therein being thereby converted into a second mixture material including products having superior resistance to deterioration in the presence of radiation.

A still further object of the invention is to provide a method wherein low molecular weight aromatic organic compounds are introduced into a nuclear reactor as a coolant, moderator or other compound thereof wherein such compounds are exposed to the nuclear radiation present therein and are converted into and/or arranged into higher molecular weight compounds possessing superior resistance to deterioration in the presence of such radiation.

Another object of the present invention is to provide a method wherein low molecular weight aromatic compounds including benzene, polyphenyls and alkylated polyphenyls as well as ethers thereof are introduced into a nuclear reactor to serve as a coolant, moderator or other component wherefore such compounds are converted into polyphenyl ether type compounds possessing superior resistance to deterioration in the presence of such radiation.

Still another object of the present invention is to provide a method wherein selected low molecular weight aromatic compounds and oxygen containing derivatives of lower molecular weight aromatic compounds are introduced into a nuclear reactor to serve as a coolant, moderator or other component thereof whenceforth exposure to such radiation under the conditions prevailing therein converts the low molecular weight compounds into a material containing higher molecular weight phenolic aromatic and polyphenyl type compounds and thereafter the produced mixture is withdrawn and such compounds are recovered and separated from the irradiated mixture.

Other objects and advantages of the invention will become apparent by consideration of the following description.

As employed in nuclear reactors, organic fluids are circulated as coolants or heat transfer agents in the primary cooling or heat transfer circuits through core regions in the vicinity of the heat producing fuel rods in the intense radiation flux produced by the nuclear reaction and through external circuits in which the heat is abstracted and utilized. Fluids of this character may also be circulated in moderator and/or reflector regions of the reactor or be disposed in suitable container configurations comprising such regions with provision being made for periodic withdrawal and replacement. Upon extended operation heavy intractable tarry materials normally form in the organic fluids and portions of the fluid are withdrawn and low boiling components are separated by distillation and returned with makeup materials to the reactor.

In operating the process of the invention, the organic fluid circulated in one or more of the aforesaid circuits or utilized to provide one or more of the stated reactor components, i.e., reflector, moderator, etc., is replaced with a starting material composition containing, as indicated above, materials selected to yield mixtures containing rearranged and/or polymeric higher molecular weight compounds. The material is maintained or circulated into the radiation flux of the reactor for a sufficient period of time to permit the content of product substances to attain a substantial level adequate to permit processing for recovery of desired substances. The entire charge is withdrawn at intervals or incrementally over extended periods of time without disrupting reactor operation. The withdrawn material is then subjected to various treatments, as described more fully hereinafter, to obtain desired products or product fractions therefrom with appropriate recovered portions and/or makeup material being returned for further treatment or use in the reactor as desired. In general, it will be most advantageous to employ nuclear reactors of the organic moderated and cooled type for such purposes; however, similar results could be attained with other reactors and with high intensity irradiation facilities. While reference may be made to the exposure of reaction mixtures serving as coolants in the following, it will be understood that the reaction mixture may also be in the form of some other functional component of the reactor.

More particularly, the starting materials which are introduced of the nuclear reactor or other radiation source may be individual compounds or admixtures of compounds of the character indicated by the following formulae:

(1)          Ar—(O—R)$_n$ (2)          Ar—(O—Ar')$_n$ (3) 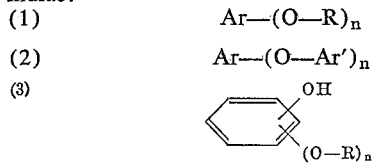

wherein Ar and Ar' may be similar or different aromatic nuclei, R may be hydrogen or an alkyl radical and $n$ may be an integer in the range of 0 through 4. Preferably the Ar radicals are phenyl radicals. With reference to Formula 3, supra, the substituent radicals are not indicated to be attached to any specific carbon atom into the benzene ring since such radicals can be non-existent or present in numbers up to a maximum of 4 and occupy any position alone or in admixture of the possible combinations or ortho-, meta- and para-positions. It will be appreciated that since it is desired to produce oxygen containing compounds, i.e., phenols and ethers, it is necessary that the starting material include oxygen as a constituent in at least one of the compounds introduced as a starting material. When phenols are to be produced it is necessary to include a phenol in the original mixture. It is conceivable that oxygen could be introduced in some other manner, e.g., as an inorganic oxide or perhaps by catalytic or radiolytic reactions. The mixture may advantageously contain a substantial proportion of nonfused ring aromatics to provide the bulk of the mixture.

Among the specific materials which may be so employed are benzene, diphenyl, terphenyls, and quaterphenyls in admixture with an oxygen containing organic compound, i.e., an aromatic ether and/or phenolic compound, as noted above and with compounds specified hereinafter. However, such oxygen containing compounds may also be employed alone. Oxygen containing aromatic compounds suitable for use in the present process include phenol, diphenyl ether, anisole (methyl-phenyl ether), guaiacol i.e., o-methoxyphenol; pyrocatechal monomethyl ether, and resorcinol monomethyl ether, i.e., $$CH_3OC_6H_4OH$$

Other relatively simple phenols and ethers containing aromatic nuclei should behave similarly. An especially desirable mixture would be one containing for example a simple nonfused ring polynuclear compound such as diphenyl possibly with some benzene and diphenyl ether which would produce higher molecular weight polyphenyl ethers generally having superior resistance to degradation in the presence of radiation and/or at high temperatures. Phenol may also be included since a portion would be converted to high molecular weight phenols and other portions into higher molecular weight polyphenyl ethers.

The proportions of reagents relative to each other may vary over wide ranges with such variations tending to produce products with predominant components derived generally from the material which is predominant in molar proportions wherever the starting materials are similar in reactivity. Other materials may be more reactive wherefore proportions may be adjusted to yield increased proportions of desired products. Proportions in the range of 5:1 to 1:5 in binary systems are typical. Proportions outside this range may be employed in cases where limited substitution is desired. The foregoing proportions are appropriate when a constant composition material is to be employed and replacement is made with a similar material. In other instances, it may be found desirable to introduce the second component in lesser initial proportions and to introduce incremental amounts thereafter so as to minimize undesirable side-reactions, etc.

Irradiation temperature conditions may likewise be varied over wide ranges and will influence the rate and nature of the product. Low temperatures ranging upwards from 0° C. in cooled irradiation devices or reactor structures such as the moderator portions may be employed. Quite satisfactory results can be obtained at temperatures in ambient ranges of 50–120° F. with limited access to air. Ordinarily an upper limit of about 700° F. is set by excessive deterioration of the reaction mixture under intense irradiation conditions such as those encountered by the coolant in nuclear reactors. Pyrolytic factors become operative at the higher temperatures (above about 400–500° F.) tending to degrade less stable components wherefore the proportion of radiation-temperature stable components tend to increase in the product. Radiation dosages will range upwardly from about $1 \times 10^8$ to above about $10^{10}$ rads.

During irradiation (radiolysis) both higher and lower molecular weight products are formed. Moreover, in addition to producing substantial quantities of desirable higher molecular weight components, rearrangements involving various portions of starting materials and intermediate products may occur wherefore a very wide variety of products may be produced. The reaction mechanisms are very complicated and cannot be easily elucidated. However, the aromatic radicals, in general, maintain their integrity upon radiolysis with bonds between aromatic nuclei or the C—O bonds being severed yielding excited radicals and molecules which may rearrange, undergo substitution, addition, polymerization and various other reactions. The rearranged, substituted and higher molecular weight products produced by such reactions will include ethers of equivalent or higher molecular weight than the starting materials, as well as phenols if a phenol was included in the original mixture, as well as increased proportions of higher molecular phenyl compounds which possess superior resistance to degradation in the presence of radiation.

More particularly, the bonds between aromatic radicals, aromatic and alkyl radicals and aromatic radicals and oxygen of any of the indicated type compounds and derivatives thereof can be opened and the opened bonds can then reform as C—C, or C—O bonds yielding higher and lower weight polyphenyls, ethers and phenols if the latter were present in the original mixture.

The reaction mixture can be resolved by conventional fractional distillation, solvent extraction, chromatographic and similar processes to yield separated products for use in the reactor or otherwise described above.

Further details of the invention will be set forth in the following illustrative examples:

EXAMPLE I

An equi-molar mixture of diphenyl ether and phenol was exposed for $1 \times 10^9$ rep. of gamma rays at ambient temperatures and with limited access to air. About 7% of the mixture was converted to higher molecular materials of which 46% boiled below 414° F. at 1 mm. Hg. The analysis and assigned composition of this fraction was found to be as follows.

| Component: | Percent by wt. |
|---|---|
| Phenyl phenol | 51.0 |
| Dihydroxy biphenyl | 8.5 |
| Triphenylene oxide | 2.2 |
| Phenoxy biphenyl | 14.9 |
| Hydroxyphenoxy biphenyl | 13.7 |
| Phenyltriphenylene oxide | 0.5 |
| Diphenyldiphenyl ether | 0.3 |
| Bis(diphenyl ether) | 8.7 |

EXAMPLE II

A variety of highly aromatic fluids, related to practical reactor coolants, were employed with a view to producing substantial proportions of polyphenyl ethers or related materials in the product. The mixtures were irradiated in vented aluminum canisters at 75° F. in the MTR (Materials Testing Reactor, Idaho Test Station) Canal source for about $10^9$ rads wherein the mixture had limited access to air. The compositions of the initial mixtures and analytical data of the product are presented in Table A, infra.

*Table A*

| | Diphenyl Ether (400 g.) and Phenol (200 g.) | Diphenyl Ether (500 g.) and Benzene (100 g.) | Benzene (100 g.) and Phenol (500 g.) | Anisole (300 g.) and Phenol (300 g.) | Anisole (350 g.) and Benzene (250 g.) | Guaiacol | Resorcinol Monomethy Ether (375 g.) and Benzene (250 g.) |
|---|---|---|---|---|---|---|---|
| Polymeric Material: | | | | | | | |
| Percent Vol. of Total Charge | 7 | 8.1 | 9.2 | 7.8 | 6.3 | 10.0 | 10.8 |
| Nondistillable | 52 | 54 | 80 | 60 | 46 | 46 | 49 |
| Distillable | 48 | 46 | 20 | 40 | 54 | 54 | 51 |
| Boiling Range, °F | <414 | <458 | <291 | <296 | <309 | <403 | <375 |
| Pressure, mm. Hg | 1 | 1 | 10 | 1 | 1 | 10 | 10 |
| True Polymer: | | | | | | | |
| Percent Vol. of Total Charge | 5.5 | 6.8 | 8.8 | 7.8 | 4.5 | 7.9 | 8.5 |
| Distillable Portion Percent Vol. of Total Chg. | 1.9 | 2.4 | 1.5 | 3.1 | 1.6 | 3.3 | 3.6 |
| Distillation Data Sample No. | 1 | 2 | 3 | 4 | 5 | 6 | 7 |

| | Mass No. | Percent Vol. | Mass No. | Percent Vol. | Mass No. | Percent Vol. | Mass No. | Percent Vol. | Mass No. | Percent Vol. | Mass No. | Percent Vol. | Mass No. | Percent Vol. | Mass No. | Percent Vol. | Mass No. | Percent Vol. |
|---|---|---|---|---|---|---|---|---|---|---|---|---|---|---|---|---|---|---|
| Mass Spectral Analysis on Distillable Portion of True Polymer. | 170 | 18.9 | 170 | 8.0 | 154 | 24.3 | 154 | 20.6 | 122 | 5.2 | 138 | 8.0 | 256 | 1.1 | 138 | 7.1 | 230 | 17.2 |
| | 186 | 14.3 | 246 | 59.6 | 170 | 59.8 | 168 | 20.7 | 136 | 1.1 | 168 | 6.0 | 258 | 0.8 | 148 | 1.1 | 244 | 1.9 |
| | 242 | 3.6 | 262 | 4.8 | 186 | 7.0 | 170 | 27.0 | 154 | 25.0 | 170 | 2.8 | 266 | 0.2 | 154 | 0.5 | 246 | 2.5 |
| | 246 | 24.6 | 322 | 2.9 | 230 | 6.9 | 184 | 17.6 | 170 | 12.6 | 182 | 3.0 | 268 | 0.4 | 170 | 3.4 | 260 | 1.8 |
| | 262 | 22.6 | 338 | 23.9 | 242 | 0.2 | 186 | 2.8 | 184 | 35.2 | 184 | 13.8 | 280 | 0.1 | 184 | 2.9 | 274 | 0.6 |
| | 318 | 0.9 | 352 | 0.6 | 246 | 1.3 | 198 | 4.5 | 198 | 4.5 | 198 | 6.7 | 282 | 0.2 | 186 | 6.3 | 276 | 0.7 |
| | 322 | 0.6 | 366 | 0.2 | 348 | 0.1 | 200 | 1.6 | 214 | 10.9 | 198 | 9.2 | 302 | 0.2 | 198 | 3.2 | 290 | 0.3 |
| | 338 | 14.5 | | | 364 | 0.4 | 212 | 1.2 | 228 | 2.5 | 200 | 12.4 | 304 | 0.2 | 200 | 22.6 | 306 | 0.4 |
| | | | | | | | 226 | 0.2 | 242 | 0.4 | 216 | 12.0 | 316 | 0.1 | 214 | 10.2 | 320 | 0.1 |
| | | | | | | | 230 | 0.3 | 256 | 0.1 | 228 | 5.7 | 318 | 0.2 | 316 | 12.2 | 336 | 0.6 |
| | | | | | | | 242 | 1.5 | 260 | 0.3 | 230 | 9.3 | 322 | 0.1 | 228 | 4.4 | | |
| | | | | | | | | | | | 242 | 3.0 | 334 | 0.1 | | | | |
| | | | | | | | | | | | 244 | 3.4 | | | | | | |

With reference to the data indicated in Table A, the product mixture obtained by irradiation was distilled to remove materials boiling at or below the starting material and the residual higher molecular weight materials, i.e., polymers, formed by irradiation were further distilled under the conditions indicated in said table. The "true polymer" indicated in Table A is the "total polymer" obtained after removal of a small amount of starting material from the residual polymer product obtained above. The distillable portion of the "true polymer" was analyzed on the high-mass mass spectrometer with the mass number and volumetric proportion product components being indicated in Table A.

The most probable compounds corresponding to such mass numbers are presented in Table B, infra, calculated on the basis of percentage of the starting material. The values shown were calculated assuming similar densities and mass spectrometer sensitivities wherefore the yields may be somewhat inaccurate but are adequate to indicate the effectiveness of the method. Lower molecular weight values are the more reliable since any overage in the results is compensated for by small amounts of unrecovered product remaining with the nondistillable portion of the polymer. Undoubtedly, very high molecular weight materials may be recovered from nondistillable residues by further fractionation, e.g., by solvent extraction, chromatography, adsorption, etc. The illustrated results may be seen to clearly demonstrate that specific product compounds can be derived by irradiation of preselected aromatic compounds and/or mixtures thereof.

Table B
PROBABLE PRODUCTS FORMED BY IRRADIATION [1] OF AROMATIC MIXTURES

| Mass No. | Probable Compound | Yield from Starting Material, Liquid Volume Percent | | | | | | |
|---|---|---|---|---|---|---|---|---|
| | | Diphenyl Ether and Phenol | Diphenyl Ether and Benzene | Benzene and Phenol | Anisole and Phenol | Anisole and Benzene | Gauiacol | Resorcinol Monomethyl Ether and Benzene |
| 154 | Biphenyl | | | 0.36 | 0.64 | 0.40 | | |
| 168 | Diphenylene Oxide of Methylbiphenyl | | | | 0.64 | | | |
| 170 | Phenyl Phenol or Diphenyl Ether | 0.36 | 0.19 | 0.31 | 0.84 | 0.20 | | |
| 172 | do | | | | | | | |
| 184 | Methoxy Biphenyl | | | | 0.51 | 0.56 | 0.45 | |
| 186 | Bis(Phenol) or Phenoxy Anisole | 0.27 | | 0.12 | | | | |
| 200 | Methoxyl Diphenyl Ether Phenoxy Anisole | | | | | | 0.41 | 0.81 |
| 214 | Bis(Anisole) | | | | | 0.17 | | 0.37 |
| 216 | Unkown | | | | | | 0.40 | 0.44 |
| 230 | Terphenyl Hydroxy Bis(Anisole) | | | 0.10 | | | | 0.64 |
| 246 | Phenyl Diphenyl Ether | 0.47 | 1.44 | | | | | |
| 262 | Hydroxyphenoxy Biphenyl or Phenoxydiphenyl Ether | 0.43 | | | | | | |
| 338 | Bis(Diphenyl Ether) | 0.28 | 0.57 | | | | | |

[1] Distillable portion of true polymer (see Table A).

While there has been described in the foregoing what may be considered to be preferred embodiments of the invention modifications may be made therein without departing from the spirit of the invention and it is intended to cover all such as fall within the scope of the appended claims.

What is claimed is:

1. In a method of operating a nuclear reactor, the steps comprising introducing a mixture of a non-fused ring phenyl hydrocarbon compound having from 1 to 4 phenyl groups therein with at least one compound selected from the group consisting of compounds of the formulae,

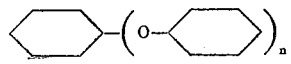

and

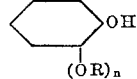

in which R may be hydrogen or an alkyl radical and $n$ may be an integer in the range of 1 through 4, into a nuclear reactor to serve as a functional component thereof and to undergo radiolytic reaction by exposure to nuclear radiation therein in excess of about $10^8$ rads to produce at least one product of the group consisting of non-fused ring polynuclear hydrocarbons, polyphenyl ethers and phenolic compounds in the mixture, and recovering said products from the reaction mixture.

2. The process as defined in claim 1 wherein said compound has the formula

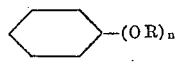

wherein $n$ is the integer 1.

3. The process as defined in claim 1 wherein said compound has the formula

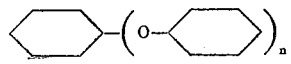

wherein $n$ is the integer 1 and said compound is diphenyl ether.

4. The process as defined in claim 1 wherein said compound has the formula

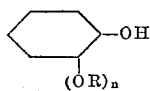

wherein $n$ is the integer 1.

5. In a method of operating a nuclear reactor, the steps comprising introducing a mixture of a material selected from the group consisting of benzene, biphenyl, terphenyls and quaterphenyls with at least one compound selected from the group consisting of compounds of the formulae,

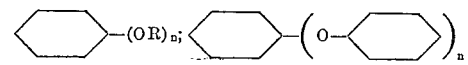

and

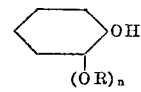

in which R may be hydrogen or an alkyl radical and $n$ may be an integer in the range of 1 through 4, into a nuclear reactor to serve as a functional component thereof and to undergo radiolytic reaction by exposure to nuclear radiation therein in excess of about $10^8$ rads and at a temperature in the range of about 0° to 700° F. to produce at least one product of the group consisting of non-fused ring polynuclear hydrocarbons, polyphenyl ethers and phenolic compounds in the mixture, and recovering said products from the reaction mixture.

6. The method as described in claim 5 wherein said material is benzene and said compound is diphenyl ether.

7. The method as defined in claim 5 wherein said material is benzene and said compound is phenol.

8. The method as defined in claim 5 wherein said material is benzene and said compound is anisole.

9. The method as defined in claim 5 wherein said material is benzene and said compound is resorcinol monomethyl ether.

References Cited in the file of this patent
UNITED STATES PATENTS

| | | |
|---|---|---|
| 2,799,698 | Taves | July 16, 1957 |
| 2,883,331 | Bolt et al. | Apr. 21, 1959 |
| 2,914,452 | Schutze et al. | Nov. 24, 1959 |

FOREIGN PATENTS

| | | |
|---|---|---|
| 708,901 | Great Britain | May 12, 1954 |
| 770,594 | Great Britain | Mar. 20, 1957 |